United States Patent [19]
Chow

[11] Patent Number: 6,104,731
[45] Date of Patent: Aug. 15, 2000

[54] METHOD AND APPARATUS FOR DATA FORWARDING IN A PROCESSOR HAVING A DUAL BANKED REGISTER SET

[75] Inventor: Michael Y. Chow, Cupertino, Calif.

[73] Assignee: Intel Corporation, Santa Clara, Calif.

[21] Appl. No.: 08/996,539

[22] Filed: Dec. 23, 1997

[51] Int. Cl.[7] .................................................. H04J 3/02
[52] U.S. Cl. ................................................ 370/537; 711/5
[58] Field of Search .......................... 370/537; 709/200, 709/245, 253; 711/5, 213, 236

[56] References Cited

U.S. PATENT DOCUMENTS 5,710,904 1/1998 Masui ............................................ 711/5

*Primary Examiner*—Chi H. Pham
*Assistant Examiner*—Brenda H. Pham
*Attorney, Agent, or Firm*—David J. Kaplan

[57] ABSTRACT

A circuit including a multiplexer and a comparator. The multiplexer has one input coupled to a portion of an odd result address bus and another input coupled to a portion of an even result address bus. The control input of the multiplexer is coupled to a least significant bit line of a source address bus. The output of the multiplexer is coupled to one input of the comparator, and the other input is coupled to a portion of the source address bus.

14 Claims, 3 Drawing Sheets

·

·

·

LOAD_PAIR [R(x)] → R(a), R(b)

ADD R(a) + R(c) → R(d)

·

·

·

METHOD AND APPARATUS FOR DATA FORWARDING IN A PROCESSOR HAVING A DUAL BANKED REGISTER SET

FIELD OF THE INVENTION

The present invention relates to computer systems and more particularly to a method and apparatus for data forwarding in a processor having a dual banked register set using a reduced number of comparators in the data forwarding circuitry.

BACKGROUND OF THE INVENTION

As consumer demand for higher performance computers increases, the speed of processors must also increase. A processor manipulates and controls the flow of data through a computer, and as the processor speed increases, the computer generally becomes more powerful. One way processor designers increase the processor's speed is through a technique called data forwarding. Data forwarding increases processing speed by providing data to an execution unit of the processor before waiting to first store and then retrieve the data from a memory location, as described in more detail below.

Software applications include programming instructions that are executed by a processor. Many of theses instructions, particularly mathematical instructions, include one or more source addresses, an operator, and a destination address. The source addresses are the memory locations where the source data (or operands) are stored. The processor retrieves the source data from memory and provides the data to an execution unit. The execution unit manipulates the source data according to the operator, and the result is stored in memory at the destination address. The transfer of data is coordinated by a control unit within the processor.

The source data is stored in the source address by a previously executed instruction. For example, the destination address of a previously executed mathematical instruction may be the source address of a subsequent instruction. Alternatively, the target address of a previously executed load instruction, instructing the processor to transfer data from a first memory location to the target address, may be the source address of a subsequent instruction. Destination, target, and other return addresses and data are also referred to as result addresses and data.

For example, for the instruction "LOAD [R(y)]→R(a)," R(a) is a memory register, and [R(y)] corresponds to another memory location which may or may not be a register. R(a) is the result address of the load instruction, and [R(y)] is an address containing the result data to be stored in the result address. The processor that executes the load instruction transfers the data from address [R(y)], passes this data to the register set containing register R(a), and stores the data in register R(a).

Suppose that the add instruction "ADD R(a)+R(c)→R (d)" follows the above load instruction in the program code. The operator of this instruction is addition "+", the source addresses are R(a) and R(c), and the destination address is R(d). Addresses R(a), R(c), and R(d) are memory locations in a register set. The processor that executes the add instruction locates the source data in registers R(a) and R(c) and transfers the data to an execution unit within the processor. The execution unit, which may include an arithmetic logic unit (ALU) or floating point unit (FPU), adds the source data values, and the result is stored in register R(d).

Note the redundancy between the add and load instructions above with respect to the data stored in register R(a). The load instruction takes time to store the result data in result register R(a). The add instruction takes time to transfer this same data from the same register, R(a), and to pass this source data to the execution unit. In a processor that supports data forwarding, the time delay associated with this redundancy is eliminated by providing the result data of the load instruction directly to the execution unit before storing the result data in the result address. Consequently, processing speed is improved. Note that, as used herein, "data R(n)" refers to the data stored at address R(n), "register R(n)" refers to the register having address R(n), and "address R(n)", "memory location R(n)", and "R(n)" refer to the address of R(n).

Unfortunately, supporting data forwarding requires the use of a number of large comparators to compare the result register addresses of previously issued instructions to the source register addresseses of subsequent instructions. If a match is found, then the result data is forwarded directly to the execution unit as source data, otherwise, the source data is transferred from the appropriate register bank. Because Comparators take up a significant amount of space, the large number of comparators in more complex processors can increase the size and cost of the processor.

SUMMARY OF THE INVENTION

A circuit is described that includes a multiplexer and a comparator. The multiplexer has one input coupled to a portion of an odd result address bus and another input coupled to a portion of an even result address bus. The control input of the multiplexer is coupled to a least significant bit line of a source address bus. The output of the multiplexer is coupled to one input of the comparator, and the other input is coupled to a portion of the source address bus.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A circuit is described for use in a source data selector in a processor that supports data forwarding. The circuit is designed to accommodate a processor that has a dual banked register set, an odd bank and an even bank, having separate result buses to each bank. The processor is capable of executing a single load instruction that simultaneously loads data into two registers, one in the odd bank and the other in the even bank.

In accordance with one embodiment of the present invention, the circuit includes three multiplexers and a comparator. The first multiplexer is configured to select either an odd result address tag or an even result address tag based on the least significant bit of the source address tag.

If the least significant bit is odd, the odd address tag is selected. If the least significant bit is even, the even address tag is selected. The output of this multiplexer is provided to the input of a comparator where the remaining bits of the source address tag are compared to corresponding bits of the result address tag to determine if there is a match. The comparator then generates a match signal.

The second multiplexer is configured to select either odd result data or even result data based on the least significant bit of the source address tag. If the least significant bit is odd, the odd data is selected. If the least significant bit is even, the even data is selected. The output of this multiplexer is provided to the input of a third multiplexer that is configured to select either the result data or register output data based on the match signal.

If the match signal indicates that there is a match, the result data is selected. If the match signal indicates that there is no match, the register output data is selected. The selected data is then provided as source data to an execution unit of the processor. A more detailed description of embodiments of the present invention, including various configurations and implementations, is provided below.

Figure 1:
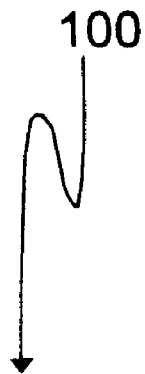
FIG. 1 is a portion of program code showing two instructions for execution on a processor formed in accordance with an embodiment of the present invention.

FIG. 1 is a portion of program code showing two instructions written for execution on a processor formed in accordance with an embodiment of the present invention. The first program instruction, LOAD_PAIR [R(x)]→R(a), R(b), instructs the processor to load data into both odd and even register banks of a dual banked register set. R(a) is an odd register residing in the odd register bank and R(b) is an even register residing in the even register bank. The data to be loaded is stored in memory address [R(x)] and the next consecutive memory address [R(x+1)]. According to the load instruction, the data at memory address [R(x)] is stored in register R(a), and the even data at memory address [R(x+1)] is stored in register R(b). As used herein, an odd register is a register having an odd address, and an even register is a register having an even address. Odd data is result data having an odd result address, and even data is result data having an even result address.

In accordance with one embodiment of the present invention, memory address [R(x)] of FIG. 1 corresponds to a register in the processor. For another embodiment, [R(x)] resides in a local cache in the processor. For other embodiments, [R(x)] resides in a memory location outside the processor such as a higher level cache or main memory of the computer system. Also, for one embodiment of the present invention, the register set containing registers R(a) and R(b) is a dual banked register set that is split high/low instead of odd/even. A dual banked register set that is split high/low contains registers R(O) through approximately R(n/2) in one bank and R(O) through R((n-1)) in another bank, where n is the total number of registers in the register set. For this embodiment, register R(a) resides in one bank and register R(b) resides in another. For an alternate embodiment, the register set is split any number of ways to create a dual banked register set having independent result buses for simultaneous, dual result data storage.

The second instruction of FIG. 1, ADD R(a)+R(c)→R(d), instructs the processor to add source data R(a) to source data R(c) and to store the result in destination register R(d). Because the processor that executes the program code of FIG. 1 supports data forwarding, the execution unit within the processor need not wait until the previous load instruction loads the result data in register R(a) before executing the add instruction. Instead, data R(a) will be transferred directly from [R(x)] to the execution unit before the data is loaded into register R(a).

Figure 2:
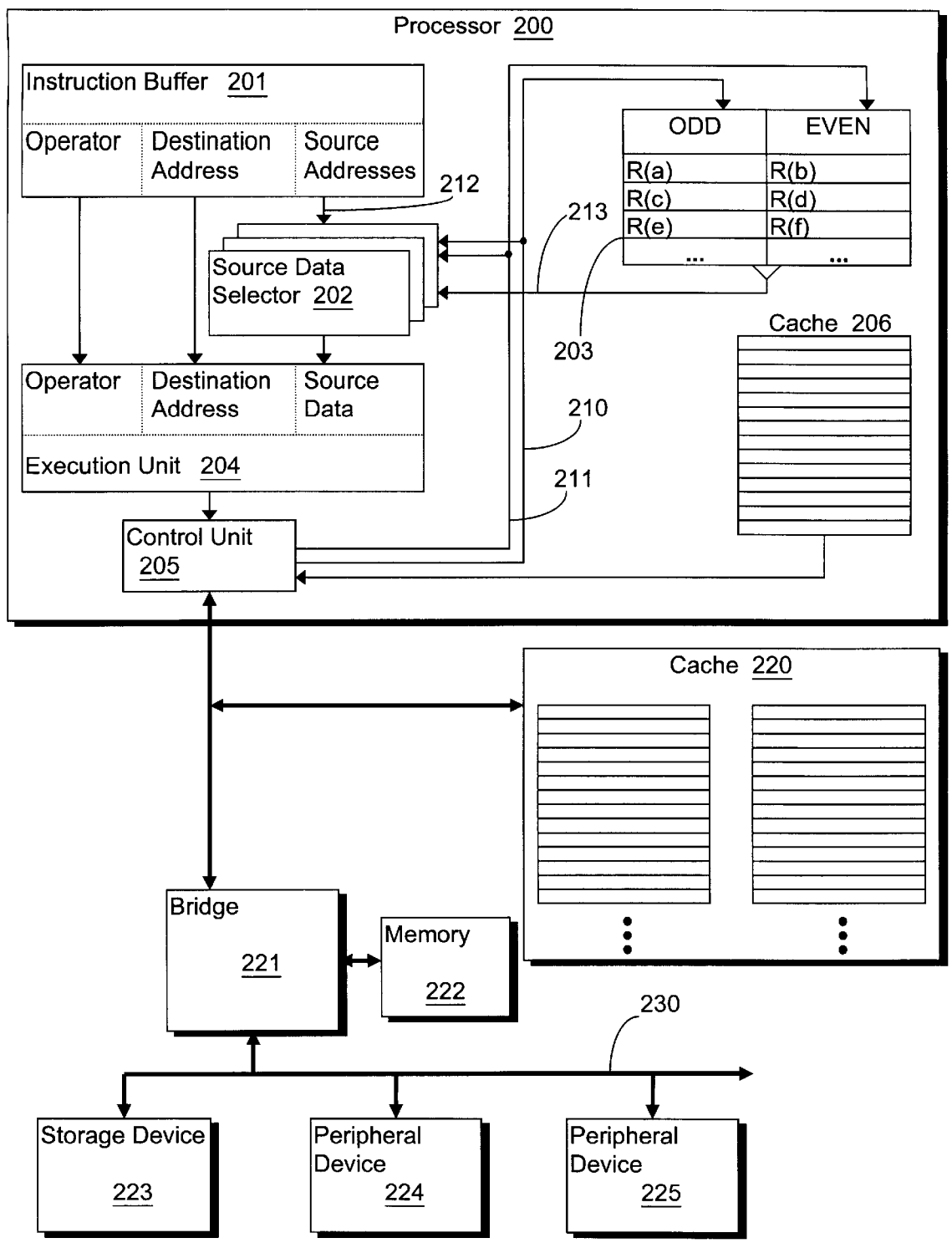
FIG. 2 is a computer system including a processor formed in accordance with an embodiment of the present invention.

FIG. 2 is a computer system including a processor formed in accordance with an embodiment of the present invention. Processor 200 is designed to execute the program instructions of FIG. 1 in the manner described above. Processor 200 includes an instruction buffer 201. Instruction buffer 201 has a first portion coupled directly to execution unit 204 and a second portion coupled, via a source address bus 212, to source data selector 202. The first portion of instruction buffer 201 stores operator and destination address information of an instruction, and the second portion stores the source addresses of the instruction. Source data selector 202 transfers source data corresponding to the source addresses to execution unit 204.

Execution unit 204 of FIG. 2 is coupled to control unit 205. Control unit 205 is coupled to the input of each of two register banks of dual banked register set 203 via separate result buses, odd result bus 210 and even result bus 211. Each of these two buses is also coupled to source data selector 202, as is the output of register set 203 via register output data bus 213. Control unit 205 is further coupled to local cache 206 within processor 200.

Outside processor 200 of FIG. 2 is cache 220, bridge 221, memory 222, storage device 223, and peripheral devices 224 and 225. Bridge 221 and cache 220 are coupled to control unit 205. Bridge 221 transfers information between processor 200 and the rest of the computer system, including main memory 222 and devices coupled to secondary bus 230.

The execution of the program code of FIG. 1 will now be described with reference to FIG. 2 starting from the point at which the load instruction has been issued to execution unit 204, and the add instruction is stored in instruction buffer 201 waiting for dispatch to the execution unit. The operator portion of instruction buffer 201 contains an addition instruction (opcode), and the destination address portion of instruction buffer 201 contains destination address R(d) of the add instruction. The source addresses portion of instruction buffer 201 contains source addresses R(a) and R(c) of the add instruction,. The add instruction waits in instruction buffer 201 until the data of registers R(a) and R(c) becomes available.

Execution unit 204 of FIG. 2, according to the load instruction issued therein, instructs control unit 205 to retrieve result data from memory locations [R(x)] and [R(x+1)] and to transfer the data to result registers R(a) and R(b), respectively, via result buses 210 and 211, respectively. For one embodiment of the present invention, [R(x)] and [R(x+1)] are located in register set 203 or another register set in processor 200 (not shown). For alternate embodiments, [R(x)] and [R(x+1)] are located in cache 206, cache 220, main memory 222, storage device 223, or one of peripheral devices 224 or 225.

As the result data of the load instruction of FIG. 1 is being returned along result buses 210 and 211 of FIG. 2, the add instruction is issued from instruction buffer 201 to execution unit 204. The operator and destination address information is forwarded directly to execution unit 204. The source addresses, R(a) and R(c), however, are transferred to source data selector 202 via source address bus 212. Source data selector 202 converts the source addresses into corresponding source data and forwards the source data to execution unit 204.

Result buses 210 and 211 of FIG. 2 transfer both the result addresses and the corresponding result data between control unit 205 and register set 203. Source data selector 202 compares the source addresses on source address bus 212 to the result addresses on result buses 210 and 211. If a match is found, the result data corresponding to the matching result address is transferred through source data selector 202 to execution unit 204 before the result data is stored in register set 203. In accordance with one embodiment of the present invention, source data selector 202 includes multiple selector circuits, one for each source address.

Because source address R(a) is an odd register belonging to the odd register bank of register set 203 of FIG. 2, R(a) is only compared to the result address on odd result bus 210. A match is found on odd result address bus 210 because R(a) is also the result address of the returning load instruction. Consequently, the result data returning from address location [R(x)] is forwarded to source data selector 202. This source data is then transferred to execution unit 202.

Because source address R(c) is also an odd register belonging to the odd register bank of register set 203 of FIG. 2, R(c) is only compared to the result address on odd result bus 210. A match is not found because R(c) is not a result address of the returning load instruction. Consequently, source data R(c) is acquired by transferring data R(c) from register R(c) of register set 203 to source data selector 202 via register output data bus 213. This source data is then transferred to execution unit 202.

For an alternate embodiment of the present invention, R(b) is a source address of the add instruction. For this embodiment, source address R(b) is only compared to the result address on even result bus 210 of FIG. 2 because R(b) is an even register belonging to the even register bank of register set 203.

Note that in accordance with the above-described embodiments of the present invention, although two independent result buses are used to return result data to register set 203 of FIG. 2, only one comparator is required per selector circuit. In contrast, for an embodiment in which each source address is compared to the address of each of the two independent result buses, each selector circuit in source data selector 202 would require two comparators, one for each result bus.

By taking advantage of the fact that each result bus is constrained to transferring only odd or even register data, the number of comparators per selector circuit is reduced by half. This results in a significant reduction in the size of source data selector 202. This is particularly true considering that one selector circuit is required for each of the maximum number of source addresses in a single instruction (which may be three or more), per processor pipeline (which may be two or more), per the number of load instructions returning at any given time (which may also be two or more). Thus, 12 or more comparators are eliminated from a source data selector designed in accordance with an embodiment of the present invention (1 comparator eliminated per selector circuit×3 source addresses×2 pipelines×2 load returns=12 comparators eliminated).

Figure 3:
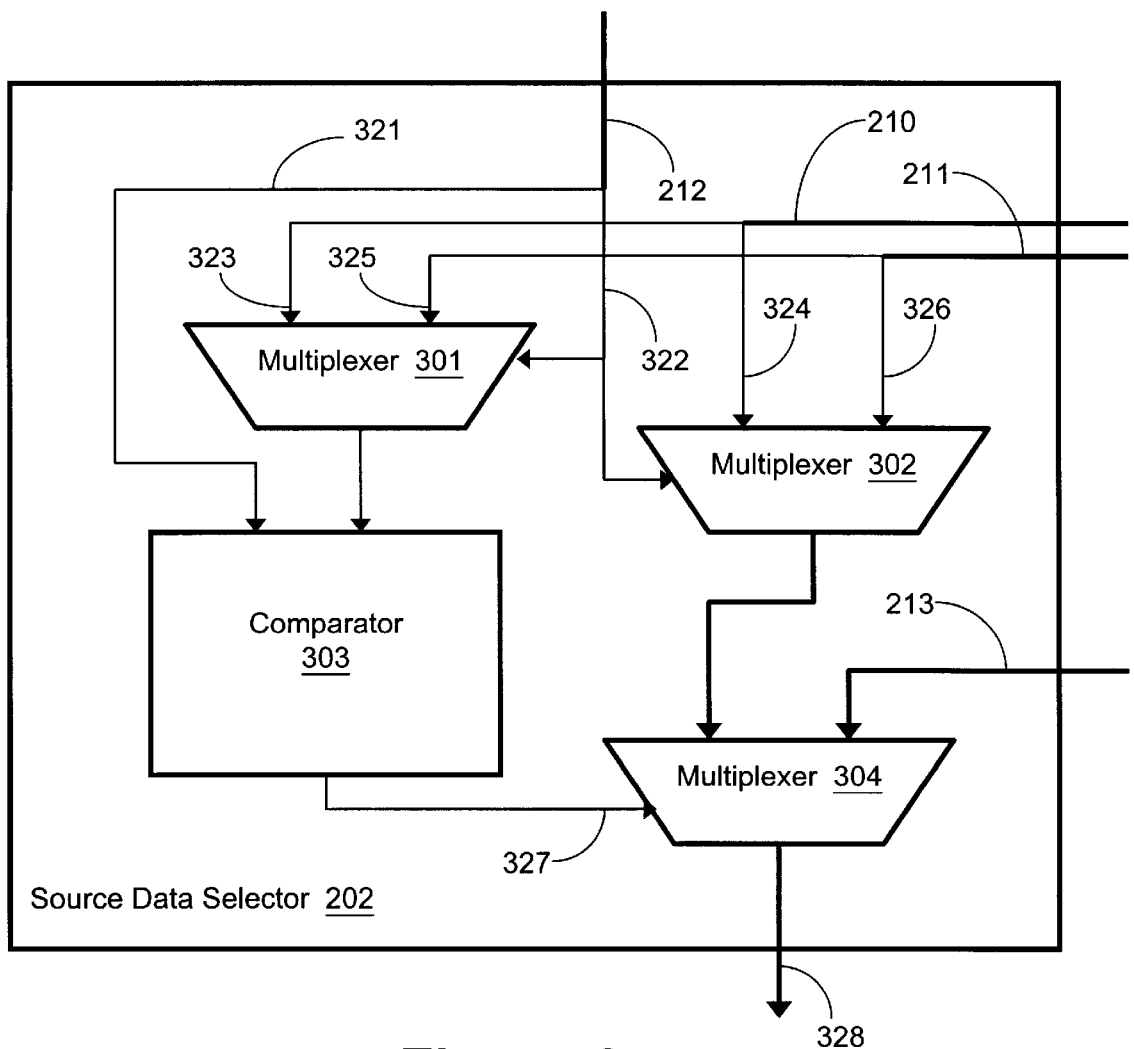
FIG. 3 is a circuit in the processor of FIG. 2.

FIG. 3 is one of any number of selector circuits in source data selector 202 of processor 200 of FIG. 2. Source address bus 212 is coupled to the control inputs of multiplexers 301 and 302, and to comparator 303. The portion of source address bus 212 that is provided to the control inputs of multiplexers 301 and 302 is the least significant bit line (line [0]) that transfers the least significant bit of a source address to source data selector 202. For one embodiment of the present invention, the other portion, 321 (lines [n:1], where n+1 is the number of bits in the source address tag), of source address bus 212 transfers the remainder of the source address tag to an input of comparator 303. In accordance with this embodiment, there is no overlap or redundancy between bit lines 321 and 322, so the remainder portion 321 is the source address tag minus the least significant bit. For an alternate embodiment, the least significant bit line is included in both portions, and is provided to both multiplexers 301 and 302 as well as to comparator 303.

Note that in accordance with one embodiment of the present invention, the addresses transferred to and used by source data selector 202 of FIGS. 2 and 3 are address tags. For another embodiment, the addresses transferred to and used by source data selector 202 are complete addresses. What is desired is that the addresses transferred to and used by source data selector 202 contain as few address bits as possible while still ensuring the accurate detection of result addresses that match source register addresses. This may require that a complete first address be compared to a complete second address, or some smaller portion of the first address be compared to a corresponding portion of the second address. These portions may or may not be predefined address tags depending on the particular implementation. For this reason, the terms address and address tag are used interchangeably herein, and both indicate all or any portion of an address needed to detect a matching address.

Odd result bus 210 of FIG. 3 is split into buses 323 and 324, and these buses are coupled to multiplexers 301 and 302, respectively. The odd result address bus 323, which transfers the odd result address tag, is provided to one input of multiplexer 301. The odd result data bus 324, which transfers the odd result data, is provided to one input of multiplexer 302. Similarly, even result bus 211 is split into buses 325 and 326, and these buses are coupled to multiplexers 301 and 302, respectively. The even result address bus 325, which transfers the even result address tag, is provided to the other input of multiplexer 301. The even result data bus 326, which transfers the even result data, is provided to the other input of multiplexer 302.

The output of multiplexer 301 of FIG. 3 is coupled to the input of comparator 303. For the embodiment in which source address bus portion 321 does not include the least significant bit line, the bus that couples the output of multiplexer 301 to the input of comparator 303 also does not include the least significant bit line. For this embodiment, comparator 303 may be smaller and faster than an embodiment in which all the bits of the source address tag and the result address tag are compared.

The output of multiplexer 302 of FIG. 3 is coupled to one of the inputs of multiplexer 304. The other input of multiplexer 304 is coupled to the register output data bus 213 which transfers register output data from register set 203 of FIG. 2. The control input of multiplexer 304 is coupled to the output of comparator 303 via match signal line 327. The output of multiplexer 304 is coupled, via source data bus 328, to execution unit 204. Note that in accordance with one embodiment of the present invention, source data selector 202 contains any of a number of selector circuits identical to the circuit shown in FIG. 3, each circuit being dedicated to different source addresses contained in a single instruction.

In accordance with the embodiment of the present invention described above in which program code 100 of FIG. 1 is executed by processor 200 of FIG. 2, source address bus 212 transfers source address R(a) to source data selector 202. As shown in FIG. 3, source address R(a) is routed to a selector circuit and is split so that the least significant bit of address R(a) is applied to the control inputs of multiplexers 301 and 302 via least significant bit line 322. The remainder of source address R(a) is provided to comparator 303 via bus 321.

Odd result bus 210 of FIG. 3, used to transfer result data from memory location [R(x)] to register R(a), provides odd result address R(a) to an input of multiplexer 301 via bus 323. Even result bus 211, used to transfer result data from memory location [R(x+1)] to register R(b), provides even result address R(b) to the other input of multiplexer 301 via bus 325. Based on the least significant bit of odd source address R(a) coupled to the control input of multiplexer 301, the multiplexer selects, as its output, odd result address R(a).

Odd result bus 210 of FIG. 3, used to transfer result data from memory location [R(x)] to register R(a), provides odd result data R(a) to an input of multiplexer 302 via bus 324. Even result bus 211, used to transfer result data from memory location [R(x+1)] to register R(b), provides even result data R(b) to the other input of multiplexer 302 via bus 326. Based on the least significant bit of odd source address R(a) coupled to the control input of multiplexer 302, the multiplexer selects, as its output, odd result data R(a).

Comparator 303 of FIG. 3 compares the source address, R(a), to the selected result address from multiplexer 301, R(a), and generates a match signal to the control input of multiplexer 304 via match signal line 327. The match signal indicates that the source address of the current add instruction matches the result address of the previous load instruction. Based on the match signal, multiplexer 304 selects, as its output, the output of multiplexer 302, odd result data R(a). This becomes the source data for the add instruction, and is provided to the execution unit of the processor via bus 328.

In accordance with the embodiment of the present invention described above, source address bus 212 also transfers source address R(c) to source data selector 202. As shown in FIG. 3, source address R(c) is routed to a selector circuit that is identical to the selector circuit to which source address R(a) is routed within source data selector 202. Source address R(c) is split so that the least significant bit of address R(c) is applied to the control inputs of multiplexers 301 and 302 via least significant bit line 322. The remainder of source address R(c) is provided to comparator 303 via bus 321.

Odd result bus 210 of FIG. 3, used to transfer result data from memory location [R(x)] to register R(a), provides odd result address R(a) to an input of multiplexer 301 via bus 323. Even result bus 211, used to transfer result data from memory location [R(x+1)] to register R(b), provides even result address R(b) to the other input of multiplexer 301 via bus 325. Based on the least significant bit of odd source address R(c) coupled to the control input of multiplexer 301, the multiplexer selects, as its output, odd result address R(a).

Odd result bus 210 of FIG. 3, used to transfer result data from memory location [R(x)] to register R(a), provides odd result data R(a) to an input of multiplexer 302 via bus 324. Even result bus 211, used to transfer result data from memory location [R(x+1)] to register R(b), provides even result data R(b) to the other input of multiplexer 302 via bus 326. Based on the least significant bit of odd source address R(c) coupled to the control input of multiplexer 302, the multiplexer selects, as its output, odd result data R(a).

Comparator 303 of FIG. 3 compares the source address, R(c), to the selected result address from multiplexer 301, R(a), and generates a match signal to the control input of multiplexer 304 via match signal line 327. The match signal indicates that the source address of the current add instruction does not match the result address of the previous load instruction. Based on the match signal, multiplexer 304 selects, as its output, the output data of register R(c) from the odd bank of register set 203 via register output data bus 213. This becomes the other source data for the add instruction, and is provided to the execution unit of the processor via bus 328.

For an alternate embodiment of the present invention, R(b) replaces R(c) as the source address of the add instruction. For this embodiment, source address bus 212 transfers source address R(b) to source data selector 202. As shown in FIG. 3, source address R(b) is routed to a selector circuit and is split so that the least significant bit of address R(b) is applied to the control inputs of multiplexers 301 and 302 via least significant bit line 322. The remainder of source address R(b) is provided to comparator 303 via bus 321.

In accordance with this embodiment, odd result bus 210 of FIG. 3 provides odd result address R(a) to an input of multiplexer 301 via bus 323. Even result bus 211 provides even result address R(b) to the other input of multiplexer 301 via bus 325. Based on the least significant bit of even source address R(b) coupled to the control input of multiplexer 301, the multiplexer selects, as its output, even result address R(b). Odd result bus 210 provides odd result data R(a) to an input of multiplexer 302 via bus 324. Even result bus 211 provides even result data R(b) to the other input of multiplexer 302 via bus 326. Based on the least significant bit of even source address R(b) coupled to the control input of multiplexer 302, the multiplexer selects, as its output, even result data R(b).

In accordance with this embodiment, comparator 303 of FIG. 3 compares the source address, R(b), to the selected result address from multiplexer 301, R(b), and generates a match signal to the control input of multiplexer 304 via match signal line 327. The match signal indicates that the source address of the current add instruction matches the result address of the previous load instruction. Based on the match signal, multiplexer 304 selects, as its output, the output of multiplexer 302, even result data R(b). This becomes the source data for the add instruction, and is provided to the execution unit of the processor via bus 328.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A circuit comprising:
    a first multiplexer having a first input coupled to a portion of an odd result address bus, a second input coupled to a portion of an even result address bus, a control input coupled to a least significant bit line of a source address bus, and an output;
    a comparator having a first input coupled to the output of the first multiplexer, a second input coupled to a portion of the source address bus, and an output;
    a second multiplexer having a first input coupled to a portion of an odd result data bus, a second input coupled to a portion of an even result data bus, a control input coupled to the least significant bit line of the source address bus, and an output; and
    a third multiplexer having a first input coupled to the output of the second multiplexer, a second input coupled to a portion of a register output data bus, a control input coupled to the output of the comparator, and an output coupled to an execution unit.

2. The circuit of claim 1, wherein the portion of the odd result address bus transfers an address tag, and the portion of the even result address bus transfers an address tag.

3. The circuit of claim 1, wherein the portion of the source address bus transfers an address tag minus a least significant bit.

4. A processor comprising:

a first multiplexer to select, as its output, a portion of either an odd result address or an even result address, based on a first portion of a source address;

a comparator, coupled to the first multiplexer, to compare the output of the first multiplexer to a second portion of the source address;

a second multiplexer to select, as its output, either odd result data or even result data, based on the first portion of the source address; and a third multiplexer, coupled to the second multiplexer and to the comparator, to select, as its output, the output of the second multiplexer or register output data, based on a comparison between the output of the first multiplexer and the second portion of the source address.

5. The processor of claim 4, wherein the first portion of the source address includes a least significant bit of the source address.

6. The processor of claim 4, wherein the second portion of the source address has no overlap with the first portion of the source address.

7. The processor of claim 4, wherein the first portion of the source address is a least significant bit of the source address and the second portion of the source address has no overlap with the first portion of the source address.

8. The processor of claim 4, wherein the portions of the odd result address and the even result address are address tags.

9. The processor of claim 4, further comprising an execution unit coupled to the third multiplexer to receive the output of the third multiplexer as source data.

10. A method of data forwarding in a processor, the method comprising:

executing a single instruction that instructs the processor to load data into an odd register and to load data into an even register;

selecting a portion of either an odd result address or an even result address as a first output based on a first portion of a source address; and comparing the first output to a second portion of the source address to generate a match signal.

11. The method of claim 10, further comprising the step of selecting either odd result data or even result data as a second output based on the first portion of the source address.

12. The method of claim 11, further comprising the step of selecting the second output or register output data as a third output based on the match signal.

13. The method of claim 12, wherein the step of selecting a portion of either an odd address or an even address and the step of selecting either odd result data or even result data are based on a least significant bit of the source address.

14. The method of claim 10, wherein the step of selecting a portion of either an odd address or an even address is based on a least significant bit of the source address.

* * * * *

UNITED STATES PATENT AND TRADEMARK OFFICE
CERTIFICATE OF CORRECTION

PATENT NO. : 6,104,731
DATED : August 15, 2000
INVENTOR(S) : Michael Y. Chow

Page 1 of 1

It is certified that error appears in the above-identified patent and that said Letters Patent is hereby corrected as shown below:

Column 3,
Line 51, delete "((n-1))" and insert -- (n-1) --.

Signed and Sealed this

Sixteenth Day of April, 2002

Attest:

JAMES E. ROGAN
Attesting Officer          Director of the United States Patent and Trademark Office